Patented June 8, 1926.

1,588,288

UNITED STATES PATENT OFFICE.

JOHN H. WRIGHT, OF MONTCLAIR, NEW JERSEY, ASSIGNOR TO ZONITE PRODUCTS COMPANY, OF NEW YORK, N. Y., A CORPORATION OF DELAWARE.

CHLORINE-CONTAINING SOLUTIONS.

No Drawing.   Application filed December 20, 1924.   Serial No. 757,109.

This invention relates to chlorine-containing solutions and is herein disclosed as embodied in a germicidal solution adapted to be stored for long periods, as on the shelves of retail stores, and to be diluted with various proportions of water for use as a mouth wash, or in other ways. The solution may be used for other than germicidal purposes. It has been found useful for bleaching organic matter.

Chlorine-containing solutions have usually proved unstable, deteriorating rapidly when stored, with the result that they have been of uncertain strength when actually used. For example the well-known Dakin's solution often loses 97% of its available chlorine within a month. Moreover, the solution of the present invention is much less irritating than Dakin's solution.

It has been known that an alkali had a stabilizing influence in chlorine germicidal solutions, but it has been supposed that, to be effective, so much alkali must be present that it increases the irritant effect of the solution.

It has been found possible to overcome all these objections and at the same time obtain a more effective solution for germicidal and other use. For this purpose a solution is made containing a suitable quantity of a substance which will control the amount of hydroxyl ion formed in the complete solution. A solution of common salt, which can be diluted to yield a fluid having the osmotic pressure of a physiologically isotonic solution, is apparently the best for domestic germicidal use. For other purposes other salts, such as an alkaline earth chloride may be used instead of common salt. In addition to the salt, the solution as shipped may contain about one-tenth of one per cent of available chlorine for each per cent of salt and a small fraction of a per cent of caustic soda, or some other material which produces a corresponding hydrogen-ion concentration.

It is found that substantially one hundred per cent of the "available chlorine" is given off from such a solution as free chlorine during spontaneous evaporation. This results from the slight excess of alkali, which however is only slightly dissociated, owing to the presence of the salt. Thus, with a small hydroxyl-ion concentration is nevertheless obtained a solution which is alkaline enough to prevent the neutralization of the solution by absorption of carbon dioxide in the course of handling or evaporation.

This complete liberation of the chlorine is useful medicinally. Because of it the solution furnishes a safe and readily available source of chlorine, capable of being used by inexperienced persons for inhalation.

Commercially the solution is prepared by electrolyzing a brine in an electrolytic cell, such as is shown in the patent to McDorman No. 1,001,876 of August 29, 1911, to produce a salt solution containing such proportions of salt and chlorine that when diluted to contain ten per cent of salt it also contains one per cent of available chlorine. It is removed from the cell when at that strength, and then alkali in the form of caustic soda is added until the solution contains at least 0.01% and not over 0.05% free caustic soda, preferably about 0.03%. The solution is then bottled. If it is desired to have more available chlorine present, the sodium chloride, alkali, and chlorine content may all advantageously be increased. For example with a content of 15% sodium chloride the available chlorine may be 1½% and the alkali increased to a preferred 0.045%, though other proportions will be found useful.

The proportions may be varied in other ways. Useful solutions were obtained when the water contained 7 per cent of salt and 1 per cent of available chlorine, together with suitable alkali; and also when the water contained 10 per cent of salt and 1½ per cent available chlorine, together with suitable alkali.

In the laboratory the solution may be prepared by various methods, as by passing chlorine gas into a solution of common salt which also contains at least the requisite amount of alkali to combine with the chlorine. The operation is stopped when the proper chlorine content is reached, and then the alkali content is tested and adjusted if necessary to the desired point. The resulting commercial solution has been found to lose less than three per cent of its available chlorine in upwards of a year's storage.

The germicidal coefficient test by modified form of the hygienic laboratory method described on pages 1559 to 1564 of Public Health Reports for July 8, 1921, Treasury Department, Washington, D. C., with organism *B. typhosus* in normal horse serum, showed that at dilutions of one to thirty to one to eighty its germicidal coefficient was 6.71 times that of Dakin's solution. Many other bacteriological tests show substantially similar results.

The suitability of the solution of the present invention for surgical and other medical use is illustrated by its relatively slight inhibition of the normal growth of new tissue. In the following table the solution of the present invention is compared with standard Dakin's solution,—attention however is called to the fact that Dakin's solution is usually used full strength while that of the present invention is usually diluted with at least five parts of water, and often with ten to thirty parts of water.

| Dilution. | Per cent increase in tissue area under standardized conditions. | |
| --- | --- | --- |
| | Solution of present invention. | Dakin's solution. |
| Pure | No growth | No growth. |
| 1:2 | 10 per cent | No growth. |
| 1:3 | 25 per cent | No growth. |
| 1:10 | 39 per cent | Slight growth. |

The hœmolytic action is markedly less than that of Dakin's solution,—the ratio being in the neighborhood of one to three or four, based on the available chlorine present.

The solution of the present invention diluted to the same per cent of available chlorine as Dakin's solution showed no irritating effect when tested on living tissue for one day according to the Austin and Taylor method, and only a trace of irritation at the end of the second day.

Having thus described certain embodiments of the invention, what is claimed is:

1. An aqueous solution of a salt of an alkali forming metal containing "available chlorine" equivalent to about one-tenth of the weight of said salt, and also containing a small fraction of a per cent of free alkali.

2. An aqueous solution containing a relatively large amount of "available chlorine", a small fraction of a per cent of free alkali, and a sufficient quantity of a salt to cause the solution upon spontaneous evaporation to give off substantially all its "available chlorine" as free chlorine.

3. An aqueous solution containing sodium chloride, available chlorine equivalent to one-tenth the weight of sodium chloride, and containing a small fraction of a per cent of free alkali.

4. An aqueous solution containing about ten per cent of sodium chloride, and about one per cent of "available chlorine", and a small fraction of a per cent of free alkali.

5. An aqueous solution containing about ten per cent of sodium chloride, and about one per cent of "available chlorine" and having a hydrogen ion concentration corresponding to about three-hundredths of one per cent of caustic soda.

6. An aqueous solution containing about ten per cent of sodium chloride, and about one per cent of "available chlorine" and about three-hundredths of one per cent of caustic soda.

In testimony whereof, I have affixed my signature to this specification.

JOHN H. WRIGHT.